United States Patent [19]
Endoh

[11] Patent Number: 5,908,012
[45] Date of Patent: Jun. 1, 1999

[54] COMBUSTION CONTROL DEVICE FOR AN ENGINE

[75] Inventor: Tsuneo Endoh, Saitama, Japan

[73] Assignee: Honda Giken Kogyo Kabushiki Kaisha, Tokyo, Japan

[21] Appl. No.: 08/973,825

[22] PCT Filed: Jun. 7, 1996

[86] PCT No.: PCT/JP96/01558

§ 371 Date: Apr. 30, 1998

§ 102(e) Date: Apr. 30, 1998

[87] PCT Pub. No.: WO96/41939

PCT Pub. Date: Dec. 27, 1996

[30] Foreign Application Priority Data

Jun. 9, 1995 [JP] Japan .................................. 7-143530

[51] Int. Cl.$^6$ .................................................. F02B 75/04
[52] U.S. Cl. .............. 123/48 B; 123/41.35; 123/48 AA; 123/78 A; 123/78 BA
[58] Field of Search ............................. 123/48 AA, 73 F, 123/78 A, 78 B, 78 BA, 78 E, 48 B, 48 A, 73 AA, 41.34, 41.35, 41.36, 41.37, 41.38, 48 R, 48 D, 316, 68

[56] References Cited

U.S. PATENT DOCUMENTS

| 2,645,213 | 7/1953 | Huber | 123/41.36 |
| 3,412,719 | 11/1968 | Sheaffer et al. | 123/41.34 |
| 5,406,911 | 4/1995 | Hefley | 123/48 B |

FOREIGN PATENT DOCUMENTS

| 3-13439 | 2/1991 | Japan . |
| 4-232345 | 8/1992 | Japan . |
| 5-223005 | 8/1993 | Japan . |

Primary Examiner—Noah P. Kamen
Assistant Examiner—Jason Benton
Attorney, Agent, or Firm—Lyon & Lyon LLP

[57] ABSTRACT

A sub-piston 19 is supported movably in the upward and downward direction on an upper end of a main piston 4 to define an air-fuel mixture cooling chamber 20 between the pistons 4 and 19. The air-fuel mixture cooling chamber 20 communicates with a peripheral edge of a combustion chamber 12. The sub-piston 19 is connected to a cam member 23 which is supported on a crankshaft 7 through a subsidiary connecting rod 21. The volume of the air-fuel mixture cooling chamber 20 is increased and decreased in operative association with the rotation of the crankshaft 7. The air-fuel mixture cooling chamber 20 has an increased volume in a phase from a compression stroke to a point immediately after ignition, and the generation of a knocking is prevented by cooling an air-fuel mixture filled in such air-fuel mixture cooling chamber 20. The volume of the air-fuel mixture cooling chamber 20 is decreased from the instant immediately after ignition, thereby causing the air-fuel mixture in the air-fuel mixture cooling chamber 20 to be pushed into the combustion chamber 12 and burned therein. Thus, even if the compression ratio is increased and the ignition timing is advanced to provide an enhancement in thermal efficiency, it can be ensured that a knocking is difficult to occur.

20 Claims, 14 Drawing Sheets

COMBUSTION CONTROL DEVICE FOR AN ENGINE

TECHNICAL FIELD

The present invention relates to a combustion control system for an engine in which a crankshaft is driven for rotation by burning an air-fuel mixture in a combustion chamber.

BACKGROUND ART

A broken line in FIG. 15 indicates a theoretical thermal efficiency in an Otto-cycle engine, and it is known that the thermal efficiency is a function of only a compression ratio and is increased with an increase in the compression ratio. However, if the compression ratio is increased, a knocking is liable to be generated. For this reason, the actual circumstances are that the engine is operated with a thermal efficiency lower than the theoretical thermal efficiency by retarding the ignition timing to lower the maximum pressure and temperature. The knocking is liable to be generated in a lower-speed rotational range and hence, the thermal efficiency is significantly reduced in the lower-speed rotational range as illustrated in FIG. 15. This is one of factors which impede the development of the engine in which a sufficient torque is produced at a lower speed.

The knocking in the lower-speed rotational range means a phenomenon in which an unburned air-fuel mixture is adiabatically compressed into a higher temperature and a higher pressure by the expansion of a combustion gas in an already burned area with progression of a surface of flame after ignition, and such unburned air-fuel mixture is self-fired before arrival of a normal surface of flame. The lower the number of rotations, the lower the burning speed, and the longer the time expired up to the arrival of the normal surface of flame and hence, the knocking is liable to occur. In this case, if the knocking is avoided by retarding the ignition timing to lower the maximum pressure and temperature, as described above, a reduction in thermal efficiency is brought about.

Therefore, there is a proposed technique for inhibiting the knocking without reducing the thermal efficiency, wherein the burning speed is increased so that a normal combustion is completed in a time as short as possible. In this case, for example, a squish area is provided to supply an intense flow to the air-fuel mixture and to supply a swirl or a tumble flow to intake air. There is also a proposed technique in which in order to reduce the burning distance to complete the normal burning in a short time, a spark plug is disposed in a central portion of a combustion chamber, and the combustion chamber is formed into a shape near a spherical shape.

However, if the speed of burning of the air-fuel mixture is increased in order to inhibit the knocking, the following problem is encountered: A combustion gas having a higher temperature is brought into contact with a wall surface of the combustion chamber and an upper surface of a piston at a higher speed and hence, the heat loss is increased due to an increase in heat transfer rate to reduce the thermal efficiency as a result. For this reason, an enhancement in thermal efficiency corresponding to an increment in compression ratio cannot be obtained.

SUMMARY OF THE INVENTION

Accordingly, it is an object of the present invention to reliably inhibit the knocking in an internal combustion engine without reducing the thermal efficiency.

To achieve the above object, according to a first aspect and feature of the present invention, there is provided a combustion control system for an engine, comprising an air-fuel mixture cooling chamber which communicates with a combustion chamber defined in a cylinder head, so that an air-fuel mixture can flow from the air-fuel mixture cooling chamber into the combustion chamber and vice versa, and a cooling-chamber volume changing means for increasing and decreasing a volume of the air-fuel mixture cooling chamber in operative association with a rotation of a crankshaft, wherein the cooling-chamber volume changing means is operable to decrease the volume of the air-fuel mixture cooling chamber during burning of the air-fuel mixture in the combustion chamber.

With the first feature of the present invention, while the air-fuel mixture in the combustion chamber is fired and a surface of resulting flame is propagated, the air-fuel mixture in the air-fuel mixture cooling chamber is cooled into a reduced temperature. Therefore, the air-fuel mixture is difficult to self-fire, thereby inhibiting the generation of a knocking. Thus, it is possible to perform an increase in compression ratio and an advance of the ignition timing without generation of the knocking, thereby enhancing the thermal efficiency. Especially, in a lower-speed rotational range in which a knocking is liable to be generated, an increase in torque can be achieved. Moreover, in the course of propagation of the surface of flame produced from the air-fuel mixture fired in the combustion chamber, the air-fuel mixture pushed out of the air-fuel mixture cooling chamber having a decreased volume into the combustion chamber is burned with a time lag. Therefore, the burning of the air-fuel mixture can be slowly conducted to inhibit the generation of $NO_x$ and to alleviate the vibration and noise.

According to a second aspect and feature of the present invention, in addition to the first feature, a sub-piston is supported movably in upward and downward direction on a main piston which is slidably received in a cylinder bore, and the air-fuel mixture cooling chamber is defined between an upper surface of the main piston and a lower surface of the sub-piston.

With the second feature of the present invention, the air-fuel mixture cooling chamber connected to the combustion chamber can be easily formed.

According to a third aspect and feature of the present invention, in addition to the second feature, a subsidiary connecting rod is relatively movably accommodated in a main connecting rod which connects the main piston and the crankshaft to each other, the subsidiary connecting rod being connected at an upper end thereof to the sub-piston and at a lower end thereof to a cam member which is rotatably supported on the crankshaft.

With the third feature of the present invention, the sub-piston supported on the main piston which is movable within the cylinder bore can be moved up and down in operative association with the crankshaft.

According to a fourth aspect and feature of the present invention, in addition to the third feature, the cam member is connected to a casing through a gear train, so that the cam member is rotated in operative association with the rotation of the crankshaft.

With the fourth feature of the present invention, the cam member can be rotated in precise operative association with the rotation of the crankshaft.

According to a fifth aspect and feature of the present invention, in addition to the fourth feature, the cam member performs one rotation for every two rotations of the crankshaft, and the volume of the air-fuel mixture cooling chamber is increased and decreased one time for every two rotations of the crankshaft.

With the fifth feature of the present invention, the volume of the air-fuel mixture cooling chamber can be controlled to the timing of ignition of the 4-cycle engine.

According to a sixth aspect and feature of the present invention, in addition to the second feature, a subsidiary connecting rod relatively movably accommodated in a main connecting rod which connects the main piston and the crankshaft to each other is connected at an upper end thereof to the sub-piston, and a swingable member swingable in operative association with the rotation of the crankshaft is pivotally supported near a lower end of the main connecting rod, the subsidiary connecting rod being connected at a lower end thereof to the swingable member.

With the sixth feature of the present invention, the sub-piston supported on the main piston movable within the cylinder bore can be moved up and down in operative association with the crankshaft.

According to a seventh aspect and feature of the present invention, in addition to the sixth feature, the swingable member is in cam engagement with the crankshaft for swinging movement.

With the seventh feature of the present invention, the swingable member can be swung in precise operative association with the rotation of the crankshaft.

According to an eighth aspect and feature of the present invention, in addition to the seventh feature, the swingable member is swung one time for every one rotation of the crankshaft, and the volume of the air-fuel mixture cooling chamber is increased and decreased one time for every one rotation of the crankshaft.

With the eighth feature of the present invention, the volume of the air-fuel mixture cooling chamber can be controlled to the timing of ignition of the 2-cycle engine.

According to a ninth aspect and feature of the present invention, in addition to the first feature, a spark plug is disposed at a substantially central portion of the combustion chamber, and the combustion chamber communicates at a peripheral edge thereof with the air-fuel mixture cooling chamber.

With the ninth feature of the present invention, the unburned air-fuel mixture which is in a high-temperature state and which is resident at the peripheral edge of the combustion chamber can be efficiently introduced under a pressure into the air-fuel mixture cooling chamber.

According to a tenth aspect and feature of the present invention, in addition to the ninth feature, the air-fuel mixture cooling chamber is defined at a substantially constant gap between an upper surface of a main piston and a lower surface of a sub-piston.

With the tenth feature of the present invention, the surface area of the air-fuel mixture cooling chamber can be ensured to the maximum relative to a volume thereof to enhance the effect of cooling of the air-fuel mixture.

According to an eleventh aspect and feature of the present invention, in addition to the first feature, a partition plate is supported movably in upward and downward direction in the cylinder head to face an upper surface of a piston; the combustion chamber is defined between the upper surface of the piston and a lower surface of the partition plate, and the air-fuel mixture cooling chamber is defined at an upper surface of the partition plate.

With the eleventh feature of the present invention, the structure of a driving mechanism of the partition plate can be simplified as compared with a case where the partition plate is mounted on a movable member such as a piston.

According to a twelfth aspect and feature of the present invention, in addition to the eleventh feature, a spark plug is disposed at one of diametrically opposite ends of the combustion chamber, and the combustion chamber communicates at the other of the diametrically opposite ends with the air-fuel mixture cooling chamber.

With the twelfth feature of the present invention, the unburned air-fuel mixture which is in a high-temperature state and which is resident at the other of the diametrically opposite ends of the combustion chamber can be efficiently introduced under a pressure into the air-fuel mixture cooling chamber.

The above and other objects, features and advantages of the invention will become apparent from the following description of the preferred embodiments taken in conjunction with the accompanying drawings.

BRIEF DESCRIPTION OF THE DRAWINGS

FIGS. 1 to 9 illustrate a first embodiment of the present invention, wherein

FIG. 1 is a vertical sectional view of an essential portion of an engine;

FIG. 2 is a sectional view taken along a line 2—2 in FIG. 1;

FIG. 3 is a sectional view taken along a line 3—3 in FIG. 2;

FIG. 4 is an enlarged view of an essential portion shown in FIG. 2;

FIG. 5 is an enlarged view of an essential portion shown in FIG. 2;

FIG. 6 is a graph illustrating the relationship between the crank angle and the height of an air-fuel mixture cooling chamber;

FIGS. 7A to 7C are illustrations for explaining the operation;

FIG. 8 is a graph illustrating the heat generation rate with respect to the crank angle;

FIG. 9 is a P-V diagram;

FIGS. 10 to 12 illustrate a second embodiment of the present invention, wherein

FIG. 10 is a vertical sectional view of an essential portion of an engine;

FIG. 11 is a sectional view taken along a line 11—11 in FIG. 10;

FIG. 12 is a graph illustrating the relationship between the crank angle and the height of an air-fuel mixture cooling chamber, wherein in the second embodiment, members or portions corresponding to those in the first embodiment are designated by the same reference characters as in the first embodiment;

FIGS. 13 and 14 illustrate a third embodiment of the present invention, wherein

FIG. 13 is a vertical sectional view of an essential portion of an engine;

FIG. 14 is a sectional view taken along a line 14—14 in FIG. 13, wherein even in the third embodiment, members or portions corresponding to those in the first and second embodiment are designated by the same reference characters as in the first and second embodiments;

DETAILED DESCRIPTION OF THE INVENTION

A first embodiment of the present invention will now be described with reference to FIGS. 1 to 12.

Figure 1:
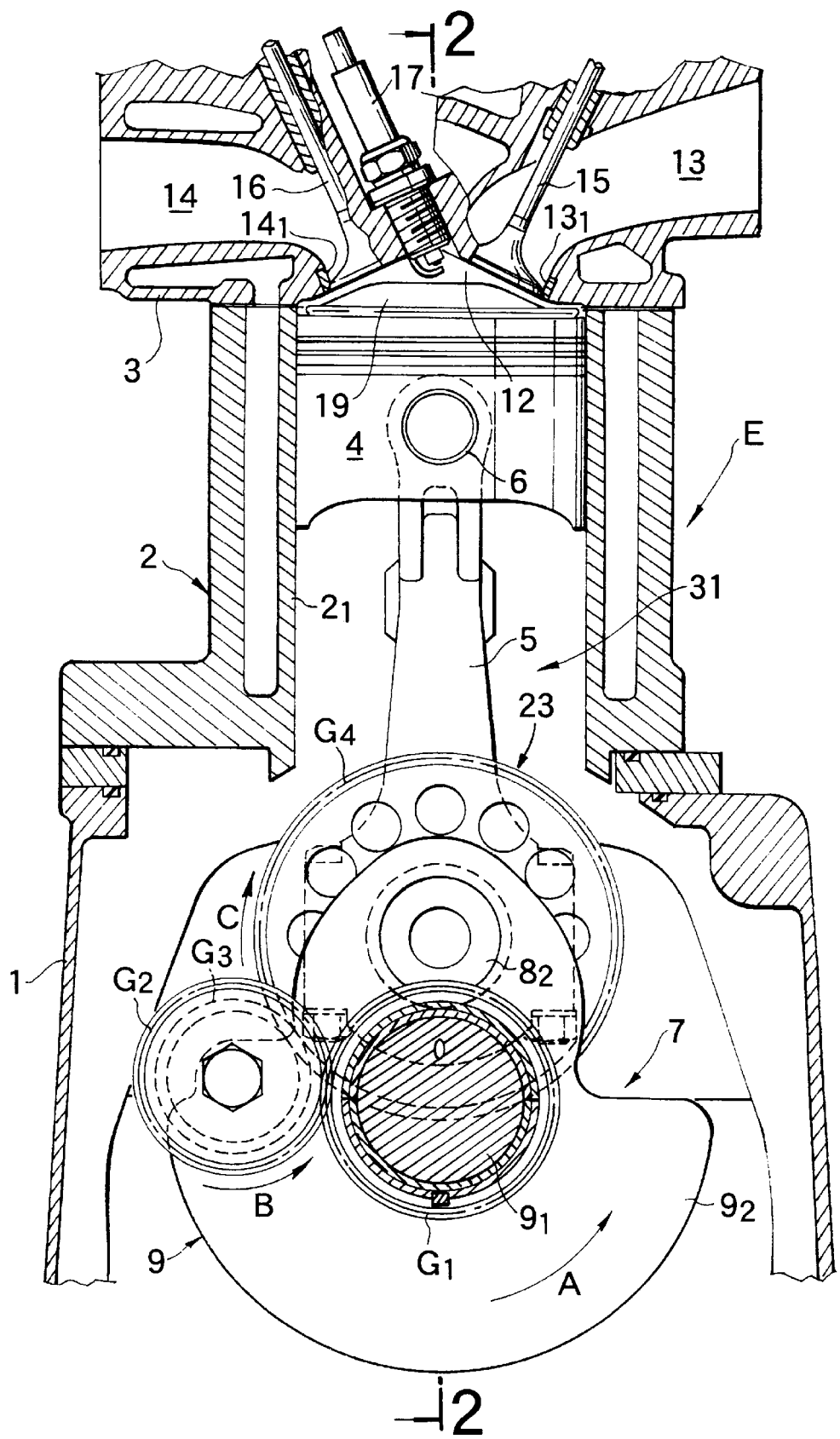
Figure 2:
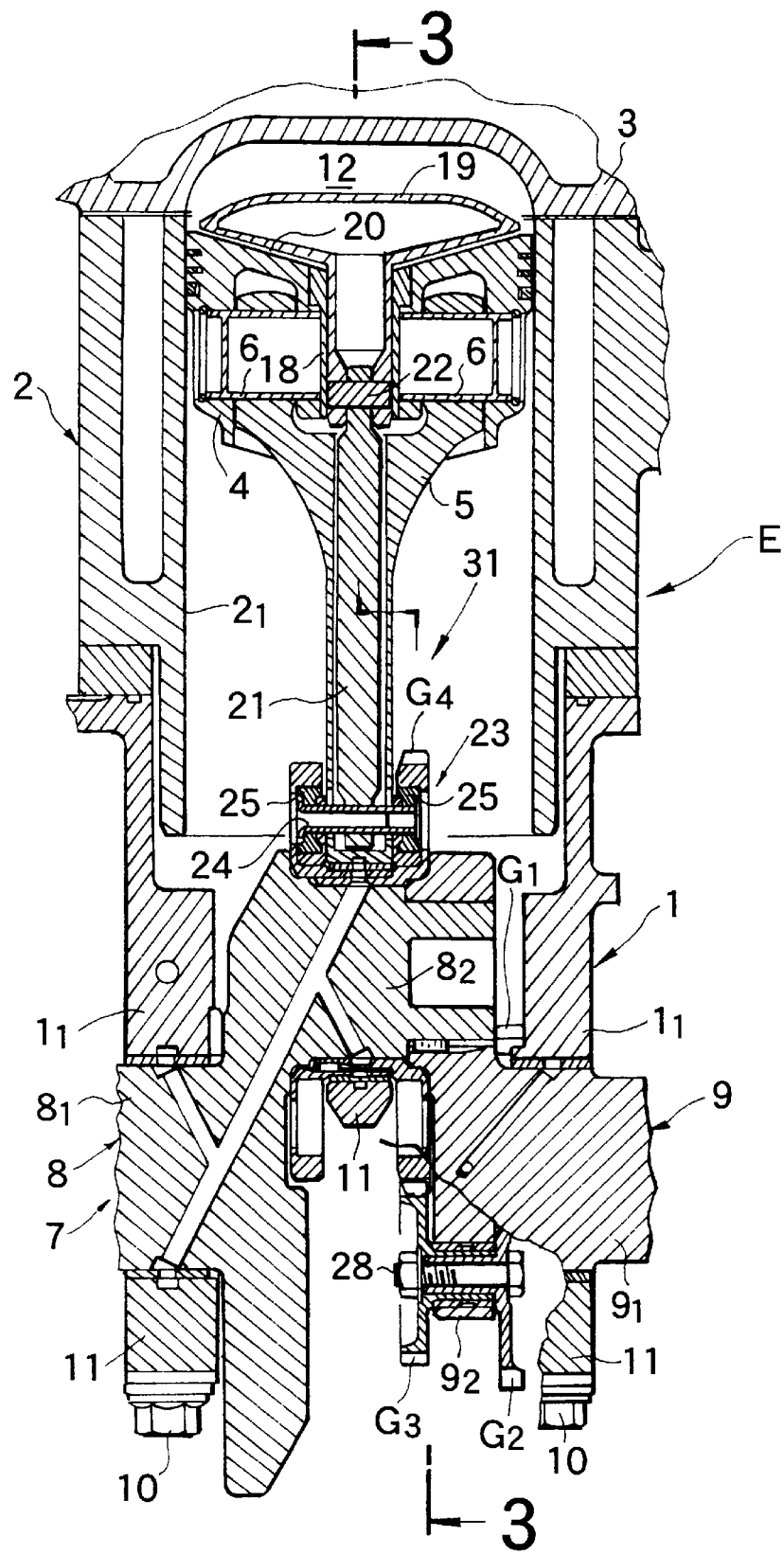
Figure 3:
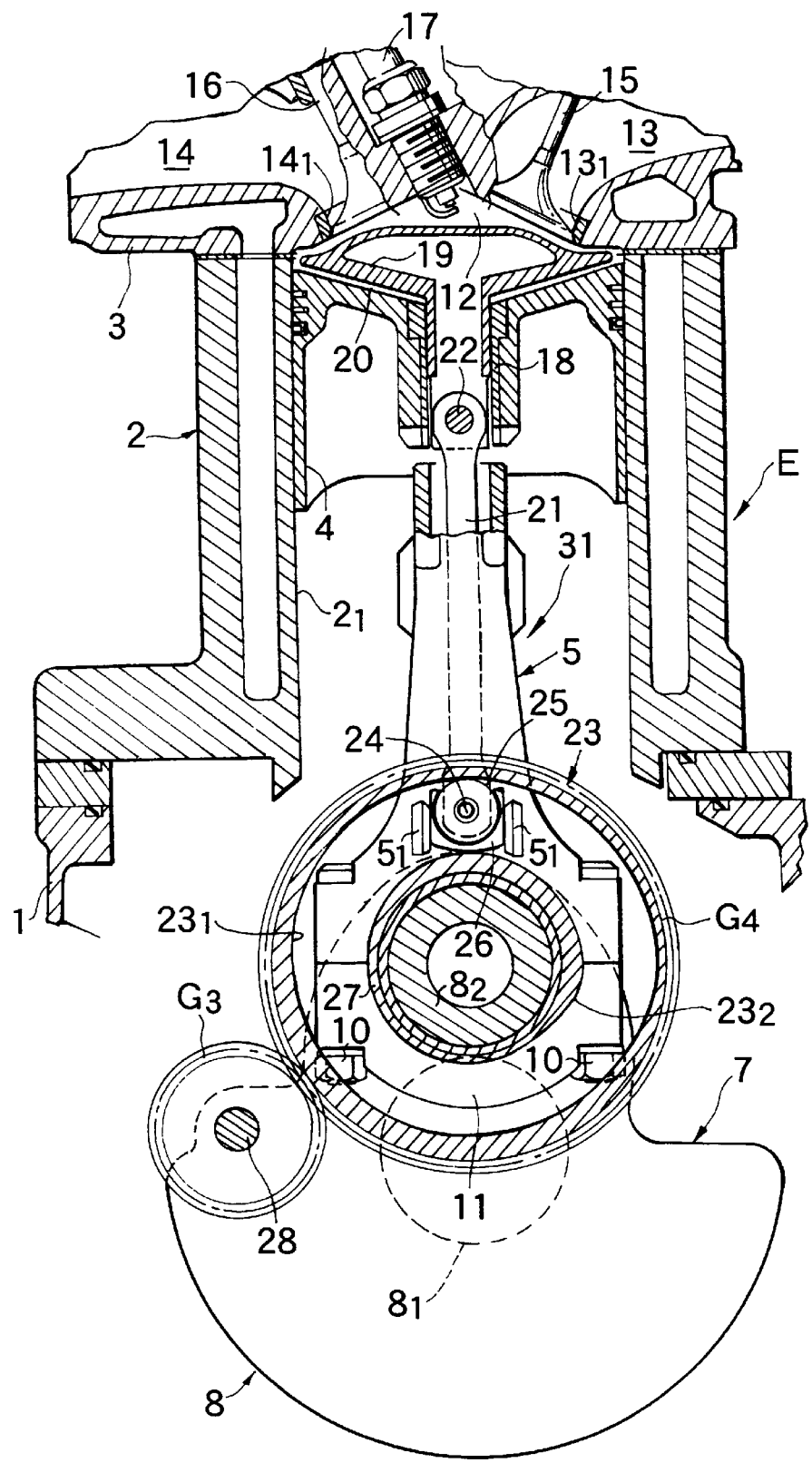

As shown in FIGS. 1 to 3, a 4-cycle and single-cylinder engine E includes a crankcase 1, a cylinder block 2 and a cylinder head 3. A main piston 4 is slidably received in a cylinder bore $2_1$ defined in the cylinder block 2 and is pivotally supported on a smaller end of a main connecting rod 5 through bisected piston pins 6, 6. A crankshaft 7 is bisected into a first crankshaft half 8 and a second crankshaft half 9. Journal portions $8_1$ and $9_1$ of the crankshaft halves 8 and 9 are rotatably supported through bearings between bearing support portions $1_1$, $1_1$ of the crankcase 1 and bearing caps 11', 11' fixed to the bearing support portions $1_1$, $1_1$ by bolts 10. The main connecting rod 5 is pivotally supported at its larger end on a pin portion $8_2$ provided on the first crankshaft half 8 of the crankshaft 7 and held in place by bearing cap 11 and bolts 10.

An intake port 13 and an exhaust port 14 are defined in the cylinder head 3 and open into a combustion chamber 12, and an intake valve bore $13_1$ and an exhaust valve bore $14_1$ are opened and closed by an intake valve 15 and an exhaust valve 16, respectively. A spark plug 17 is mounted in the cylinder head 3 to face a central portion of the combustion chamber 12.

Figure 4:
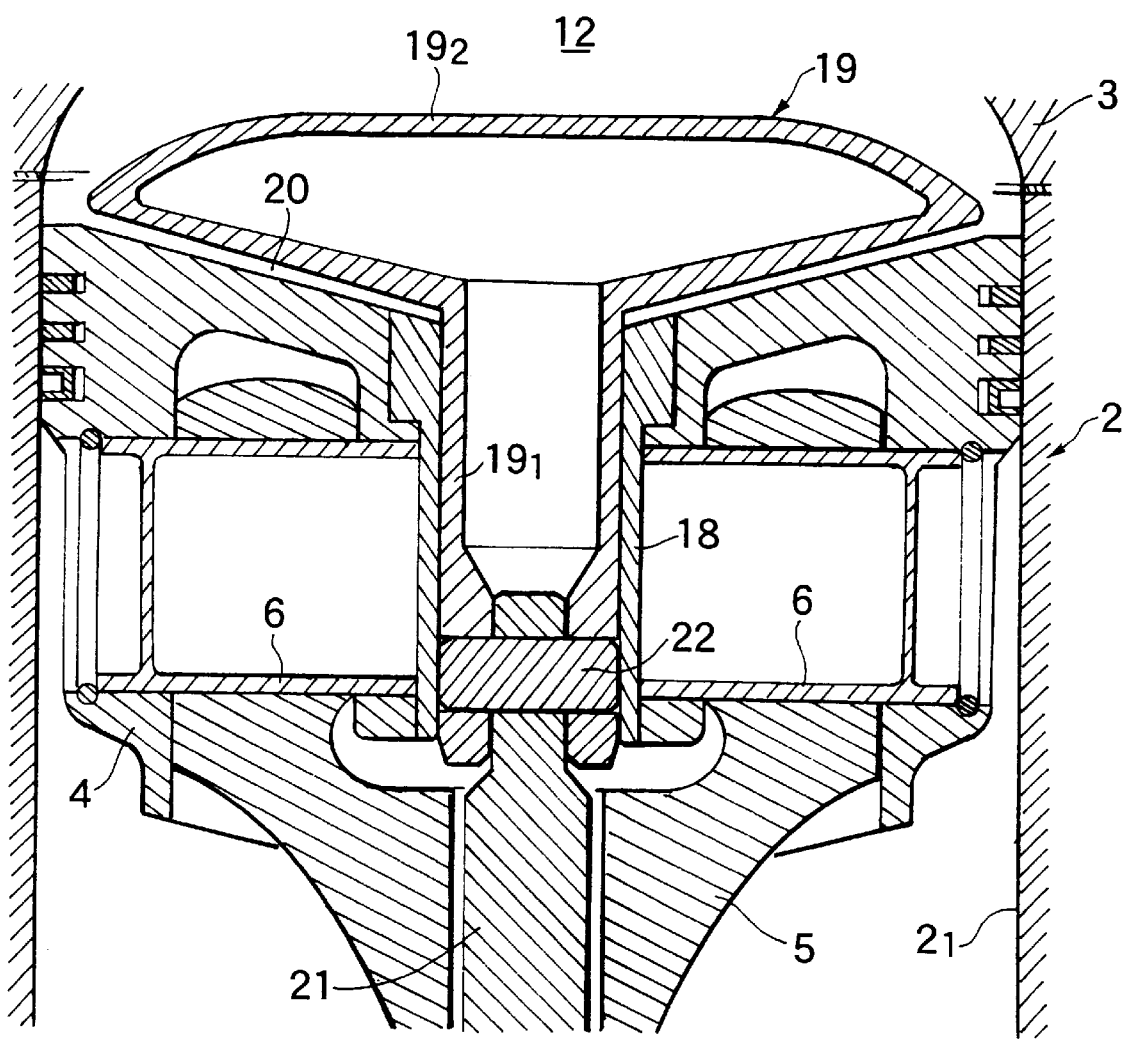

As can be seen from reference to FIGS. 1 to 3 in combination with FIG. 4, a leg $19_1$ of a sub-piston 19 is supported slidably in upward and downward direction in a cylindrical bushing 18 mounted along a center axis of the main piston 4. The leg $19_1$ is integrally provided at its upper end with an umbrella-like portion $19_2$ having substantially the same diameter as the main piston 4, so that a lower surface of the umbrella-like portion $19_2$ can be moved toward and away from an upper surface of the main piston 4. When the sub-piston 19 is moved upwards relative to the main piston 4, a conical air-fuel mixture cooling chamber 20 is defined between the sub-piston 19 and the main piston 4 to spread obliquely and upwards to communicate with a peripheral edge of the combustion chamber 12.

The structure of a cooling-chamber volume changing means 31 for increasing and decreasing the volume of the air-fuel mixture cooling chamber 20 will be described with reference to FIGS. 4 and 5.

As shown in FIG. 4, the main connecting rod 5 is hollow, and a subsidiary connecting rod 21 is loosely fitted in the main connecting rod 5 and pivotally supported at its upper end on the leg $19_1$ of the sub-piston 19 through a pin 22.

Figure 5:
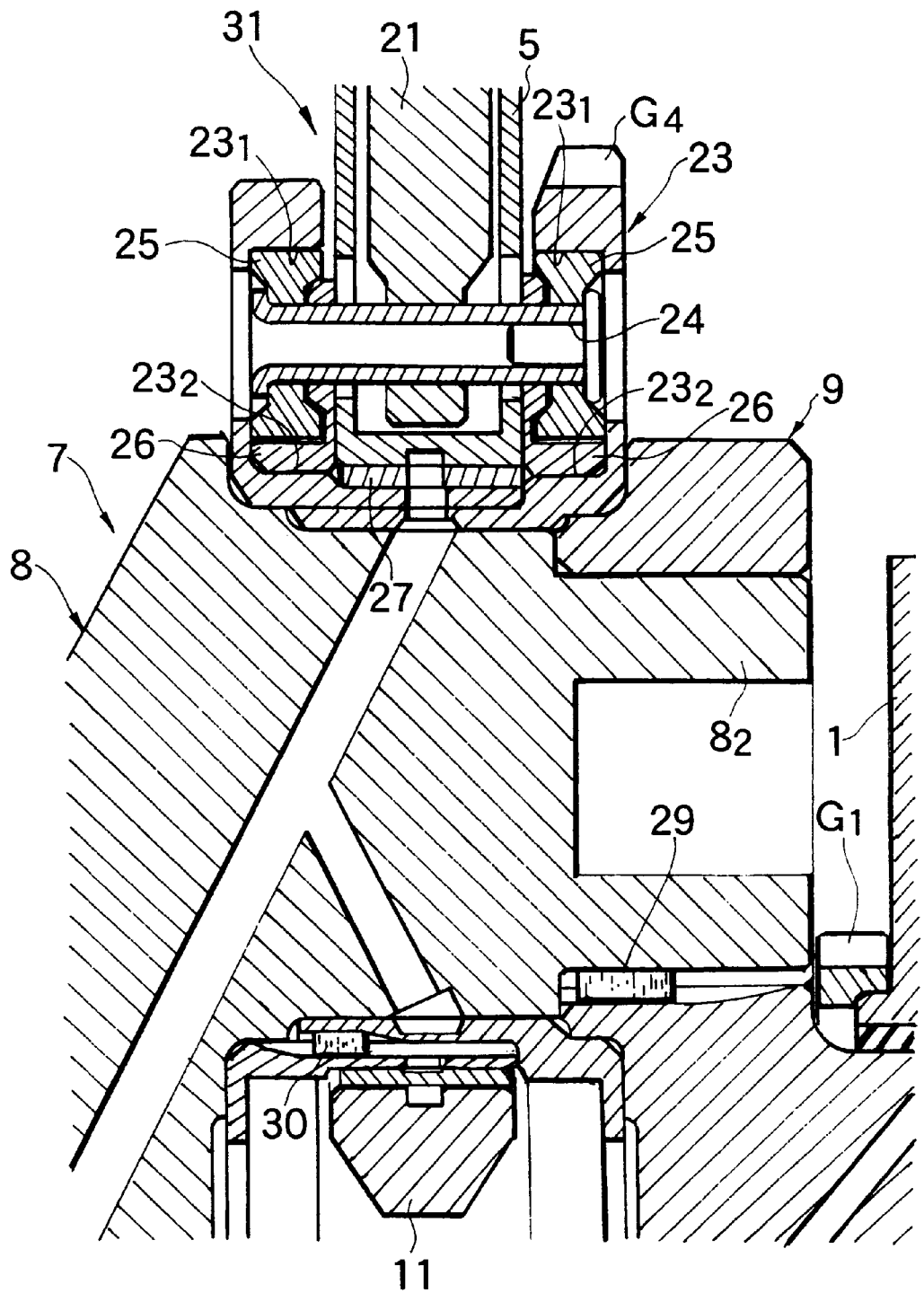

As shown in FIG. 5, a ring-like cam member 23 is rotatably carried on an outer periphery of the pin portion $8_2$ of the crankshaft 7. Defined on opposite sides of the cam member 23 sandwiching the main connecting rod 5 are a pair of outer peripheral cam surfaces $23_1$, $23_1$ positioned at radially outer locations, and a pair of inner peripheral cam surfaces $23_2$, $23_2$ positioned at radially inner locations. A pair of rollers 25, 25 as cam followers are supported at opposite ends of a pin 24 secured to a lower end of the subsidiary connecting rod 21 of the sub-piston 19, so that they are rolled along the pair of outer peripheral cam surfaces $23_1$, $23_1$. A pair of slippers 26, 26 as cam followers are also supported on the pin 24, so that they are slid along the pair of inner peripheral cam surfaces $23_2$, $23_2$.

Each of the slippers 26 is moved up and down while being guided on a pair of guide portions $5_1$, $5_1$ (see FIG. 3) projectingly provided on sides of the main connecting rod 5.

A bushing 27 is mounted at sliding contact portions of the cam member 23 and the larger end of the main connecting rod 5. In FIG. 5, a reference character 29 is a key which connects the first crankshaft half 8 and the second crankshaft half 9 to each other, and a reference character 30 is a key which integrally connects the cam member 23 that is divided into two members.

As can be seen from FIGS. 1 and 2, a first gear $G_1$ is fixed to the crankcase 1 to surround the outer periphery of the journal portion $9_1$ of the second crankshaft half 9 of the crankshaft 7. A second gear $G_2$ and a third gear $G_3$ integrally coupled to each other by a bolt 28 are rotatably carried on a balance weight portion $9_2$ of the second crankshaft half 9. The second gear $G_2$ is meshed with the first gear $G_1$, and the third gear $G_3$ is meshed with a fourth gear $G_4$ which is integrally formed on the cam member 23.

The numbers $Z_1$, $Z_2$, $Z_3$ and $Z_4$ of teeth of the first, second, third and fourth gears $G_1$, $G_2$, $G_3$ and $G_4$ are set as follows: $Z_1=45$, $Z_2=36$, $Z_3=28$ and $Z_4=70$. Therefore, when the crankshaft 7 is rotated in a direction of an arrow A in FIG. 1, the second and third gears $G_2$ and $G_3$ are rotated in a direction of an arrow B, and the fourth gear $G_4$ is rotated in a direction of an arrow C. In this case, the cam member 23 performs one rotation for every two rotations of the crankshaft 7, because $(Z_2/Z_1)\times(Z_4/Z_3)=2$.

When the cam member 23 is rotated, the subsidiary connecting rod 21 with the rollers 25, 25 guided on the outer peripheral cam surfaces $23_1$, $23_1$ and with the slippers 26, 26 guided on the inner peripheral cam surfaces $23_2$, $23_2$ is moved up and down relative to the main connecting rod 5. This causes the umbrella-like portion $19_2$ of the sub-piston 19 with the leg $19_1$ guided on the bushing 18 to be moved to or away from the main piston 4, whereby the height of the air-fuel mixture cooling chamber 20 defined between the lower surface of the umbrella-like portion $19_2$ of the sub-piston 19 and the upper surface of the main piston 4 is varied, for example, in a range of 0 mm to 0.7 mm.

Figure 6:
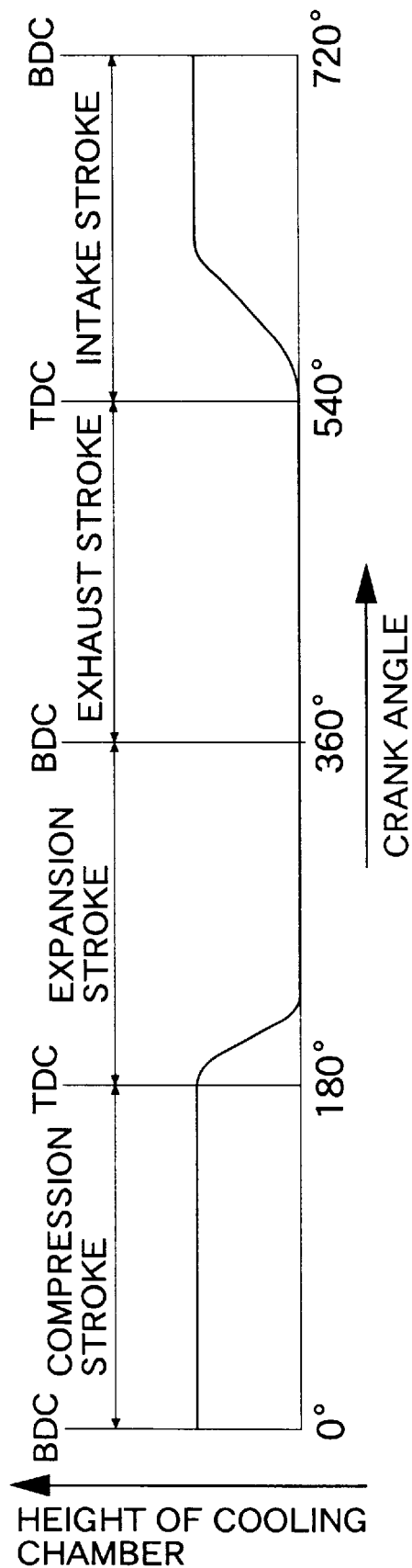
Figure 7:
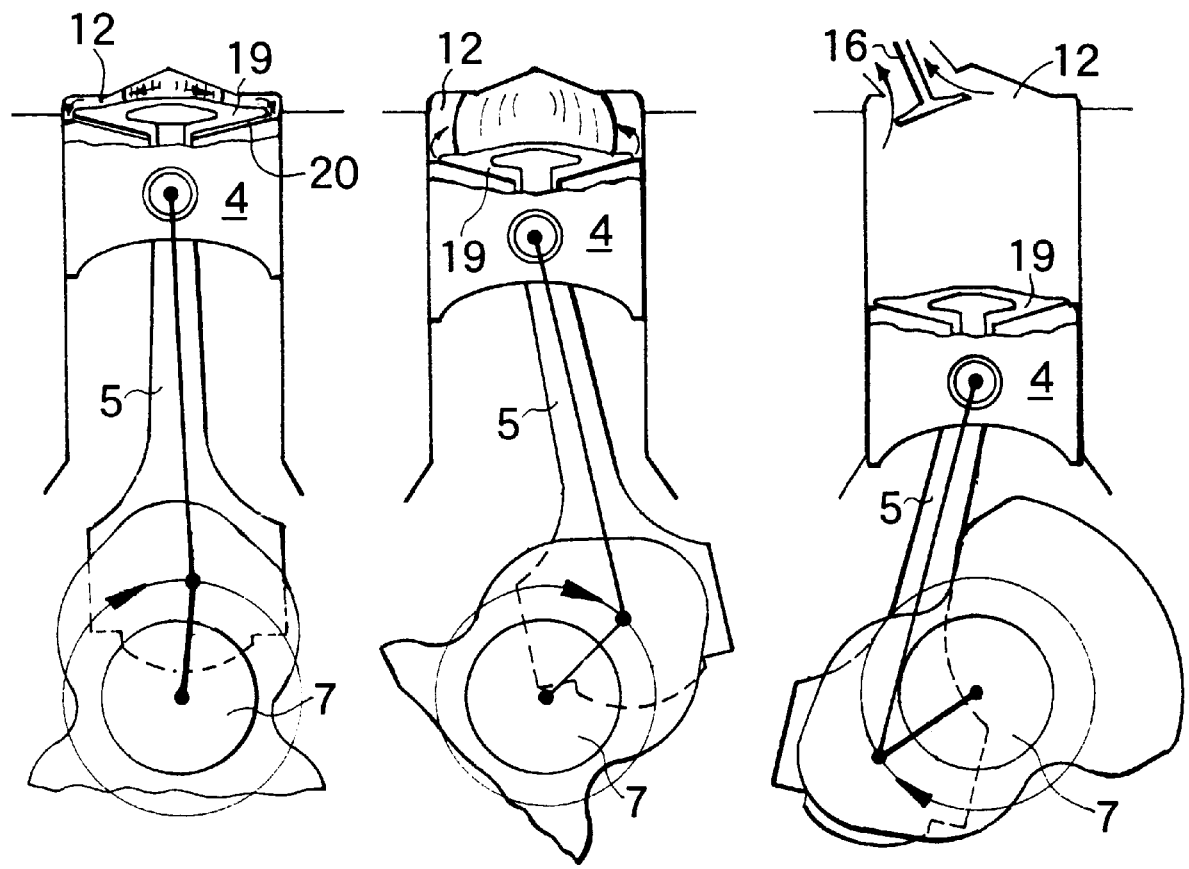

As shown in the graph of FIG. 6, if the crank angle θ at a bottom dead center at which a compression stroke is started is defined as θ=0°, the air-fuel mixture cooling chamber 20 is open during the compression stroke at a crank angle θ equal to 0° to 180°, and started to be closed from near a top dead center immediately after ignition and completely closed near a crank angle θ=220° in an expansion stroke. In a second half of the expansion stroke and in an exhaust stroke, the air-fuel mixture cooling chamber 20 remains closed, and in an intake stroke, the air-fuel mixture cooling chamber 20 is opened again at a crank angle θ in a range of 540° to 620°.

The operation of the embodiment of the present invention having the above-described arrangement will be described below.

When the crankshaft 7 is rotated in the direction of the arrow A in FIG. 1, the cam member 23 performs one rotation for every two rotations of the crankshaft 7 in the direction of the arrow C, as described above. As is apparent from the graph in FIG. 6, in the compression stroke at a crank angle θ=0° to 180°, the subsidiary connecting rod 21 with the rollers 25, 25 guided on the outer peripheral cam surfaces $23_1$, $23_1$ of the cam member 23 and with the slippers 26, 26 guided on the inner peripheral cam surfaces $23_2$, $23_2$ is pushed upwards relative to the main connecting rod 5. As a result, the sub-piston 19 connected to the upper end of the subsidiary connecting rod 21 is relatively lifted relative to the main piston 4, thereby defining the air-fuel mixture cooling chamber 20 having a height of, for example, 0.7 mm between the upper surface of the main piston 4 and the lower surface of the umbrella-like portion $19_2$ of the sub-piston 19.

From near the top dead center ($\theta=180°$) at which the expansion stroke is started, the subsidiary connecting rod 21 with the rollers 25, 25 and slippers 26, 26 guided on the cam member 23 is pulled down relative to the main connecting rod 5, thereby causing the height of the air-fuel mixture cooling chamber 20 to be gradually decreased. At near $\theta=220°$, the upper surface of the main piston 4 abuts against the lower surface of the umbrella-like portion $19_2$ of the sub-piston 19, thereby causing the height of the air-fuel mixture cooling chamber 20 to become 0 mm. Thereafter, the height of the air-fuel mixture cooling chamber 20 is maintained at 0 mm for a period from the second half of the expansion stroke through the exhaust stroke to the start of the intake stroke ($220°<\theta<540°$). Then, at a first half of the intake stroke ($540°<\theta<600°$), the height of the air-fuel mixture cooling chamber 20 is gradually increased from 0 mm to 0.7 mm and maintained at 0.7 mm until the compression stroke is completed.

A portion of an air-fuel mixture drawn through the intake port 13 into the combustion chamber 12 in the intake stroke is also charged into the air-fuel mixture cooling chamber 20 having an increased volume. The air-fuel mixture cooling chamber 20 has an extremely large surface area substantially equal to a sum of a surface area of the upper surface of the main piston 4 and a surface area of the lower surface of the sub-piston 19, irrespective of an extremely small volume thereof. Therefore, when the air-fuel mixture is adiabatically compressed in the compression stroke, a heat transfer from the air-fuel mixture in the air-fuel mixture cooling chamber 20 to the sub-piston 19 and the main piston 4 is promoted to suppress the excessive rising of the temperature of the air-fuel mixture.

As shown in FIG. 7A, the spark plug 17 mounted at the central portion of the combustion chamber 12 generates a spark near the top dead center, a surface of flame of the air-fuel mixture fired at the central portion of the combustion chamber 12 is propagated toward the peripheral edge of the combustion chamber 12. At this time, the air-fuel mixture in the air-fuel mixture cooling chamber 20 is maintained cool during compression and initial firing by the heat transfer to the sub-piston 19 and the main piston 4 and hence, cannot be self-fired without waiting for the arrival of the flame surface, thereby previously inhibiting the generation of a knocking.

The self-firing of the air-fuel mixture existing at locations spaced apart from the spark plug 17 (i.e., within the air-fuel mixture cooling chamber 20 and on the peripheral edge of the combustion chamber 12) is prevented as described above and therefore, if the compression ratio is set at a higher value, or even if the ignition timing is not specially retarded, the generation of the knocking can be avoided, whereby the enhancement in the thermal efficiency and the prevention of the generation of the knocking can be effectively compatible.

Figure 8:
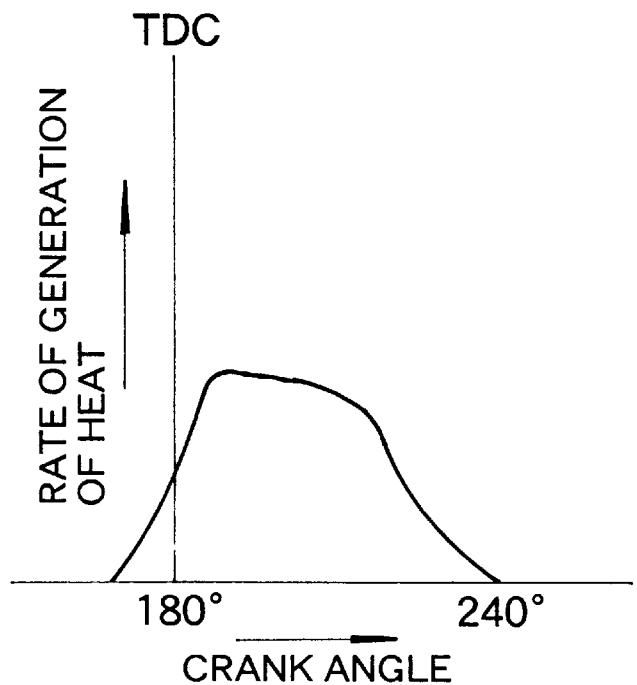

As shown in FIG. 7B, while the surface of flame of the fired air-fuel mixture is propagated from the central portion of the combustion chamber 12 toward the peripheral edge, the air-fuel mixture in the air-fuel mixture cooling chamber 20 is pushed to the peripheral edge of the combustion chamber 12 by reducing the volume of the air-fuel mixture cooling chamber 20, and is burned thereat. In this way, the burning of the air-fuel mixture is not performed in the air-fuel mixture cooling chamber 20, but is performed only in the combustion chamber 12 having the surface area which is small as compared with its volume. Therefore, it is possible to suppress the loss in cooling of the combustion gas to the minimum to enhance the thermal efficiency. In addition, it is possible to control the duration of the burning to the completion of the burning of all the air-fuel mixture and a rate of heat generated from the air-fuel mixture with the lapse of the time to any extent, as shown in FIG. 8, by changing the setting of the amount of air-fuel mixture injected from the air-fuel mixture cooling chamber 20 into the combustion chamber 12 and the timing of the injection.

Thus, it is possible to slowly conduct the burning to drop the maximum temperature within the combustion chamber 12, thereby reducing the amount of $NO_x$ in an exhaust gas and reducing the variation in pressure in the combustion chamber 12 to prevent the generation of a vibration and a noise.

As shown in FIG. 7C, the air-fuel mixture cooling chamber 20 is completely closed in the exhaust stroke and hence, the combustion gas cannot be retained in the air-fuel mixture cooling chamber 20, and when the air-fuel mixture cooling chamber 20 is opened in the next intake stroke, only the air-fuel mixture can be filled thereinto.

Figure 9:
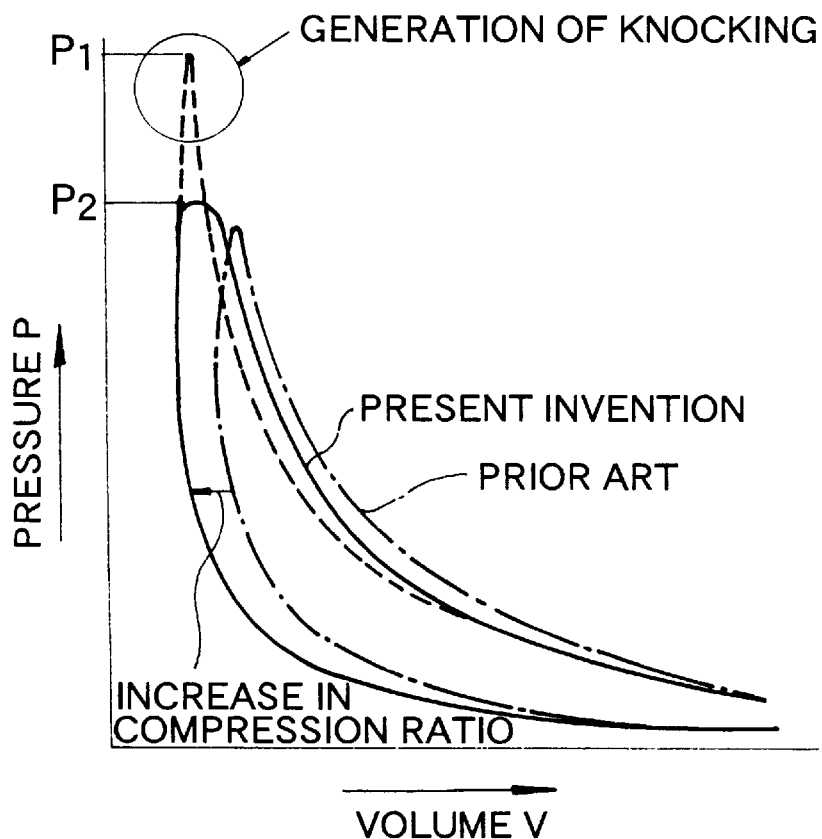

In the P-V diagram in FIG. 9, a dot-dash line corresponds to the prior art engine wherein the generation of a knocking is prevented by decreasing the compression ratio and retarding the ignition timing. If only the compression ratio is increased without application of the present invention to the prior art engine, the maximum pressure is risen to $P_1$, as shown by a broken line, thereby permitting the generation of a knocking. However, according to the present invention shown by a solid line, the burning of the air-fuel mixture drawn and charged into the air-fuel mixture cooling chamber 20 is retarded and moreover, the combustion chamber 20 functions as a pressure buffering chamber. Therefore, the maximum pressure due to the burning is increased only to $P_2$, thereby preventing the generation of a knocking reliably by cooperation with the effect of cooling the air-fuel mixture by the air-fuel mixture cooling chamber 20. Thereafter, the pressure is maintained at a higher level without being increased in the form near to the constant-pressure burning in a diesel engine, by continuation of the burning of the air-fuel mixture discharged from the air-fuel mixture cooling chamber 20.

The cycle of the engine according to the embodiments of the present invention departs from a theoretic Otto cycle due to a reduction in effective pressure with the above-described slow burning. However, it is possible to increase the compression ratio and to set the ignition timing at near an optimal ignition timing by the prevention of the knocking, thereby remarkably enhancing the thermal efficiency, and to make up for disadvantages due to the departing from the Ofto cycle to provide advantages.

A second embodiment of the present invention will be described below with reference to FIGS. 10 to 12.

Figure 10:
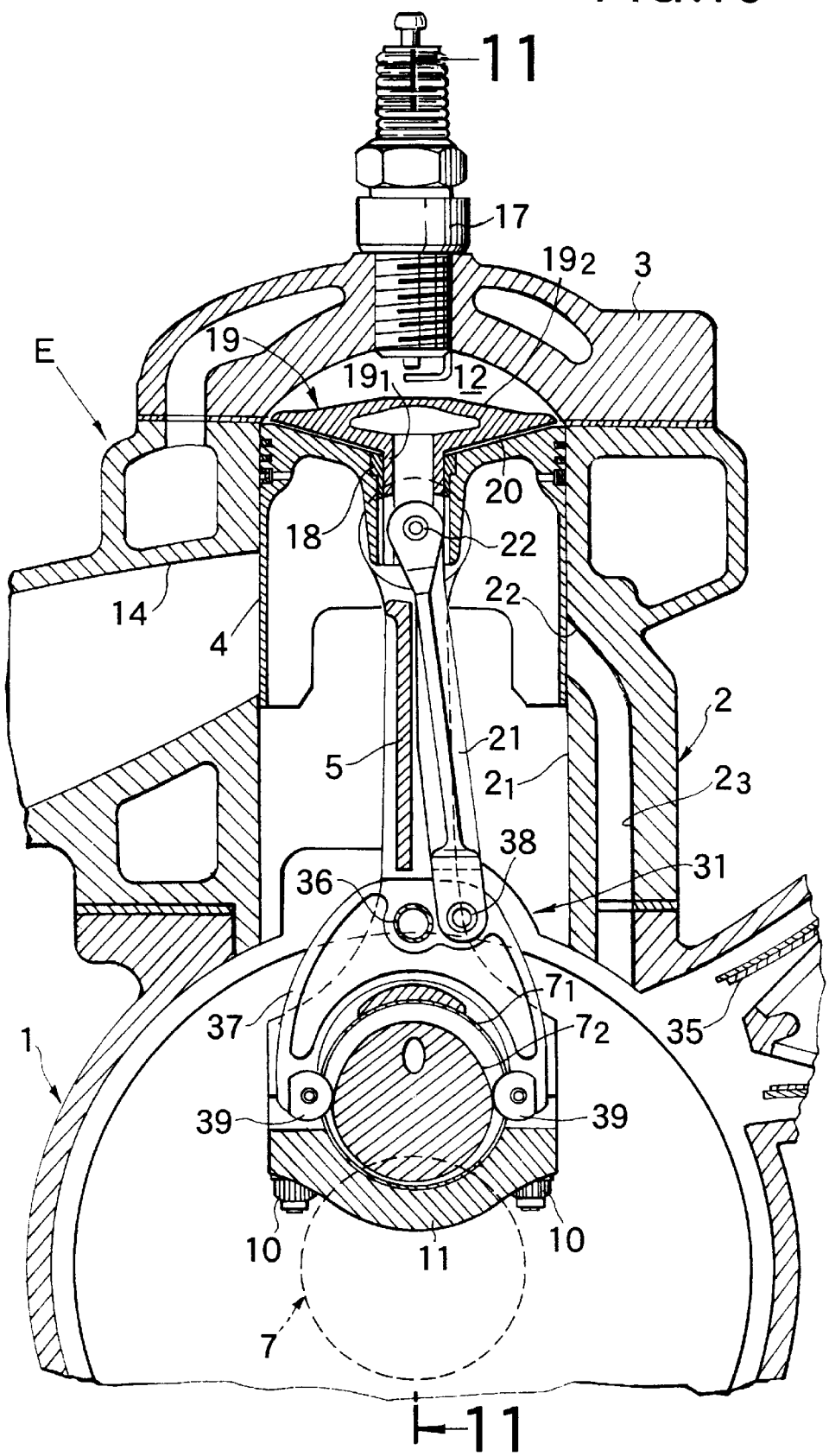
Figure 11:
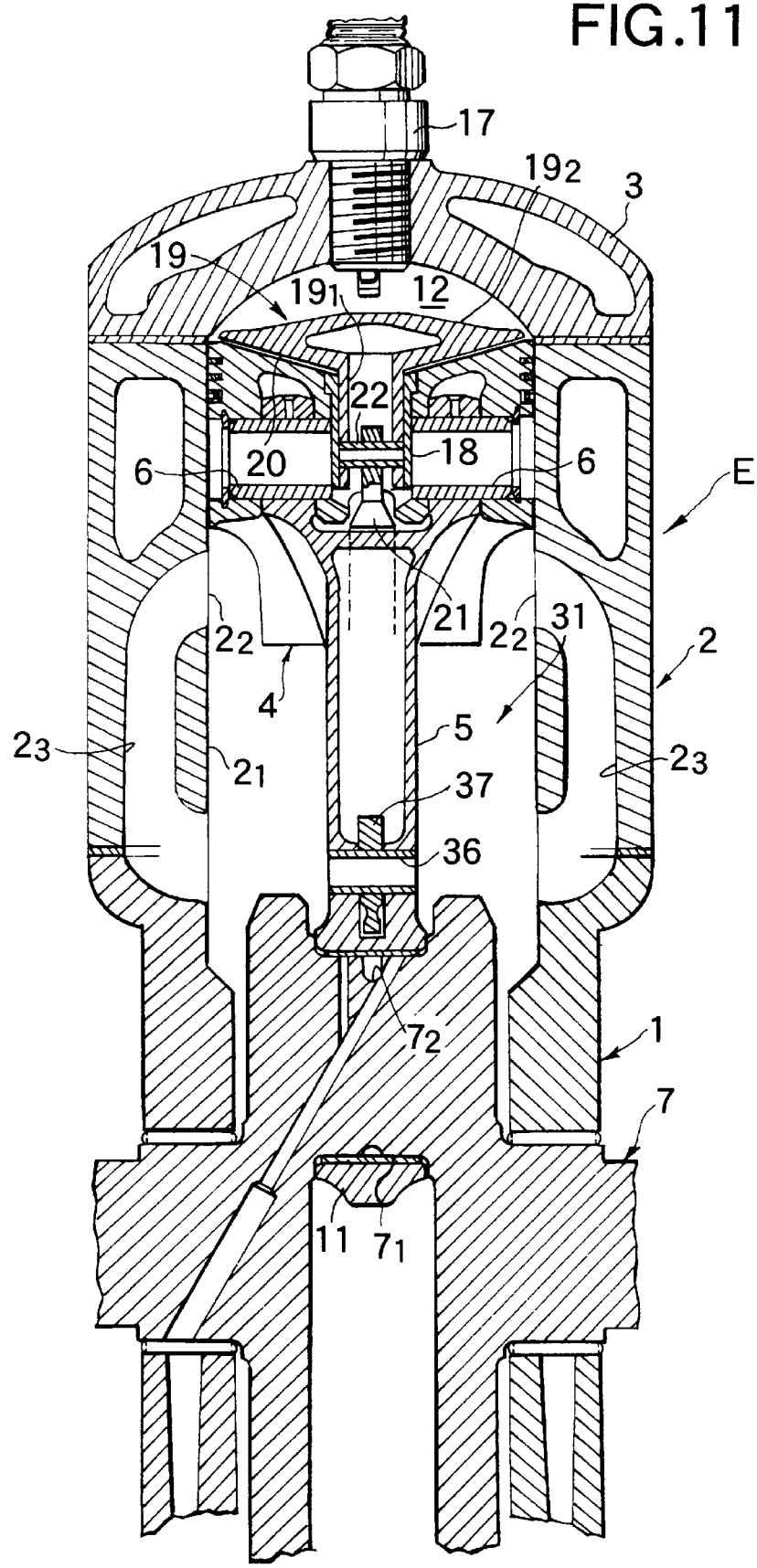

As shown in FIGS. 10 and 11, the engine E is a 2-cycle and single-cylinder engine of a case reed valve type. The engine E includes a reed valve 35 mounted in a wall surface of a crankcase 1 to permit the communication of the inside and outside of the crankcase 1 with each other, and a pair of scavenging passages $2_3$, $2_3$ which are provided in a wall surface of a cylinder block 2 to connect a pair of scavenging ports $2_2$, $2_2$ opening into a cylinder bore $2_1$ to a crank chamber.

As in the first embodiment, the second embodiment includes a sub-piston 19 which is supported movably in upward and downward direction on a main piston 4 through a leg $19_1$. An air-fuel mixture cooling chamber 20 communicating with a peripheral edge of the combustion chamber 12 is defined between an upper surface of the main piston 4 and a lower surface of an umbrella-like portion $19_2$ of the sub-piston 19.

The structure of a cooling-chamber volume changing means 31 which is operable to increase and decrease the volume of the air-fuel mixture cooling chamber 20 will be described below. A subsidiary connecting rod 21 is relatively movably accommodated in a main connecting rod 5 and connected at its upper end to the leg $19_1$ of the sub-piston 19 through a pin 22. A bifurcated fork-like swingable member 37 is pivotally supported at its upper portion near the larger end of the main connecting rod 5 through a pin 36, and the subsidiary connecting rod 21 is pivotally supported at its lower end on the swingable member 37 through a pin 38.

A cam groove $7_2$ is provided in an outer periphery of a pin portion $7_1$ of the crankshaft 7, and a pair of cam followers 39, 39 mounted at a lower end of the swingable member 37 abut against the cam groove $7_2$.

According to the second embodiment, whenever the crankshaft 7 performs one rotation, the swingable member 37 is swung in one reciprocation about the pin 36 through the cam groove $7_2$ and the cam followers 39, 39, and the sub-piston 19 connected to the swingable member 37 through the subsidiary connecting rod 21 is moved up and down in one reciprocation relative to the main piston 4, whereby the volume of the air-fuel mixture cooling chamber 20 is varied with the rotation of the crankshaft 7.

Figure 12:
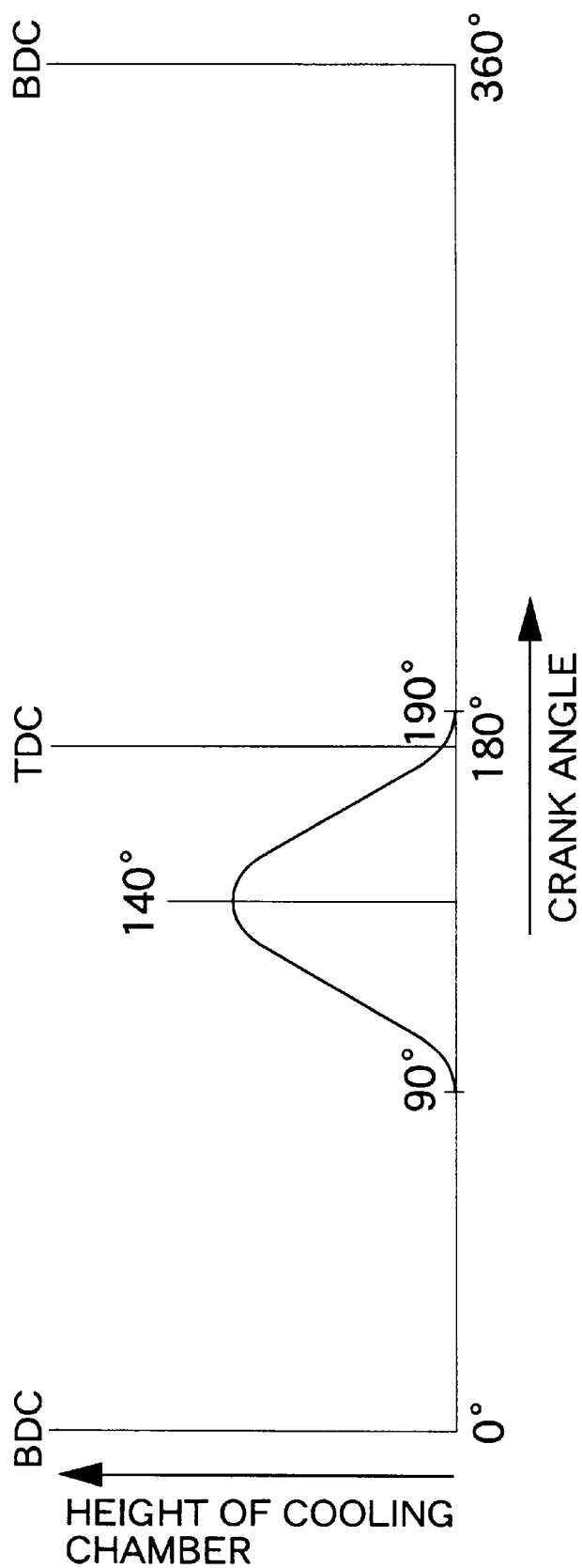

As is apparent from FIG. 12, if the crank angle θ at the bottom dead center is defined as being equal to 0°, the volume of the air-fuel mixture cooling chamber 20 is set, so that it is started to be increased near a crank angle θ equal to 90°; becomes the maximum value near a crank angle θ equal to 140° slightly short of the top dead center and is then gradually decreased till near a crank angle θ equal to 190° slightly passing the top dead center. In the 2-cycle engine in which one explosion is conducted for every one rotation of the crankshaft 7, the increasing and decreasing of the volume of the air-fuel mixture cooling chamber 20 are carried out near each top dead center in the above manner.

As a result, as in the previously-described first embodiment, even if the compression ratio is increased to enhance the thermal efficiency, the generation of the knocking can be prevented by maintaining the air-fuel mixture cool that is drawn and charged into the air-fuel mixture cooling chamber 20 by the heat transfer from the wall surface of the air-fuel mixture cooling chamber 20 during the compression of the air-fuel mixture within the combustion chamber 12. By discharging the air-fuel mixture from the air-fuel mixture cooling chamber 20 decreased in volume to burn the air-fuel mixture during propagation of the surface of flame of the air-fuel mixture fired by the spark plug 17, the burning of the air-fuel mixture can be conducted more slowly over a long time than the burning in the prior art, which can contribute to a reduction in the amount of $NO_x$ and reductions in noise and vibration.

Figure 13:
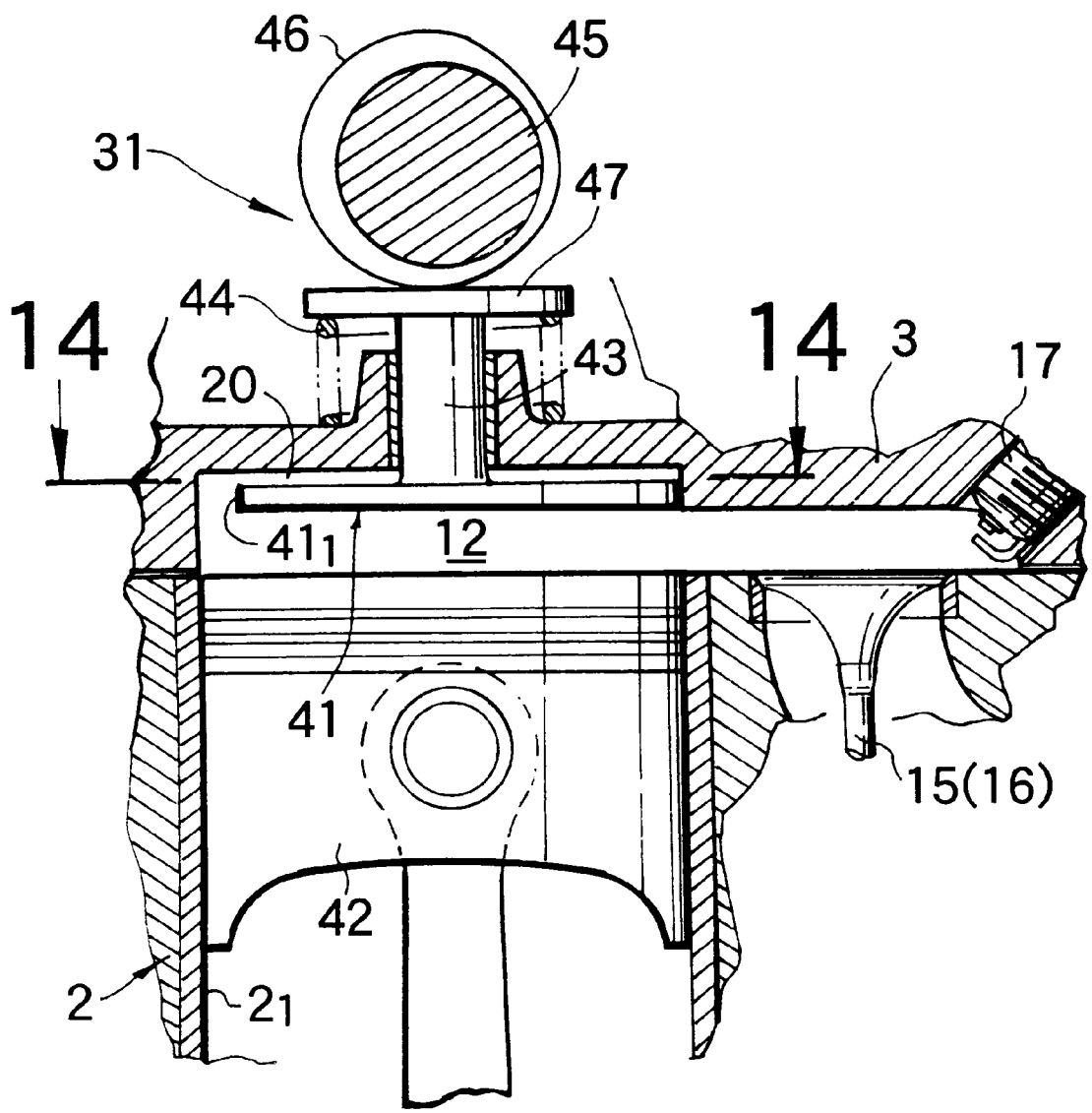
Figure 14:
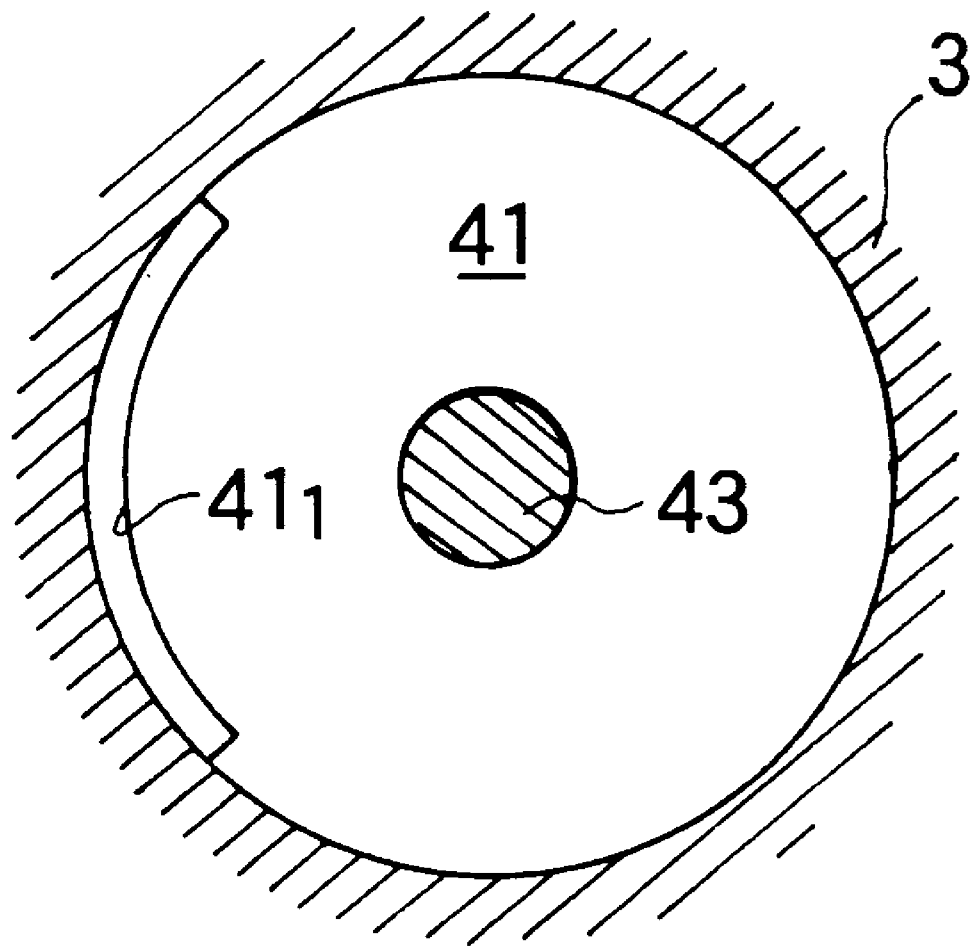
Figure 15:
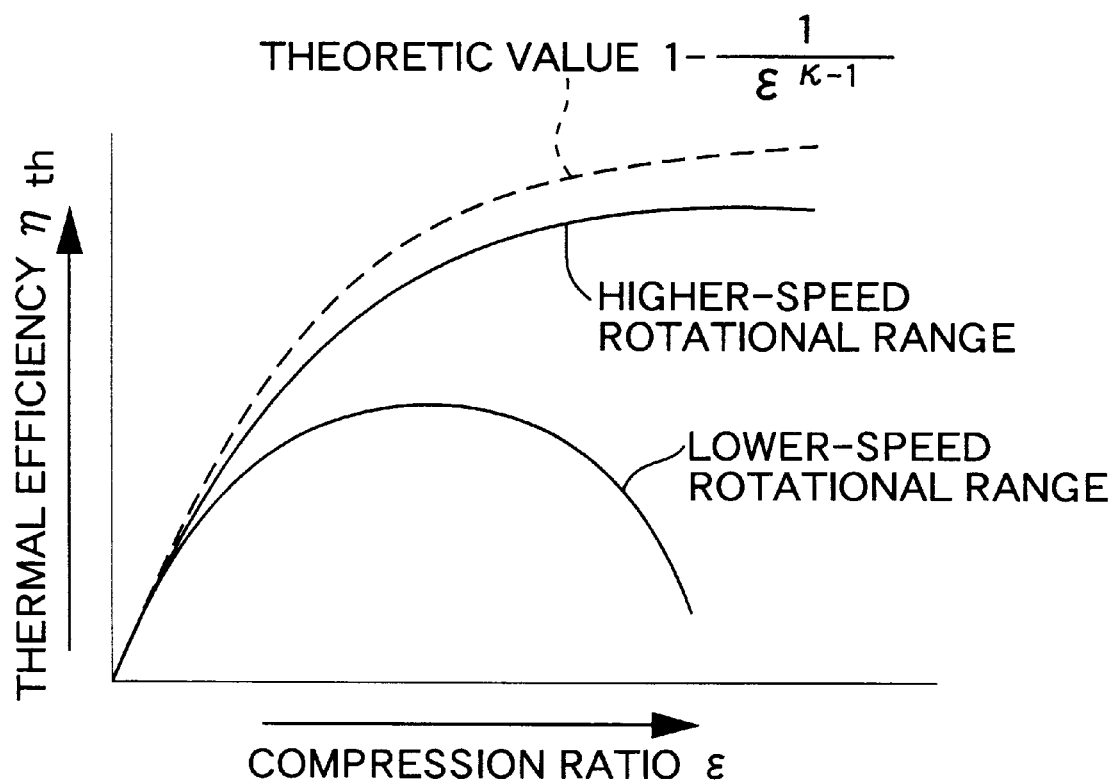
FIG. 15 is a graph illustrating the theoretic thermal efficiency in an Otto-cycle engine.

A third embodiment of the present invention will be described below with reference to FIGS. 13 and 14.

In the third embodiment, the present invention is applied to a 4-cycle engine of a side valve type. The engine E includes a combustion chamber 12 which has a portion extending laterally in one radial direction from a cylinder bore $2_1$, and the inlet valve 15, the exhaust valve 16 and the spark plug 15 are installed in that extending portion of the combustion chamber. A partition plate 41 is disposed movably in upward and downward direction in the cylinder head 3 to face the combustion chamber 12. The combustion chamber 12 is defined between an upper surface of a piston 42 and a lower surface of the partition plate 41, and an air-fuel mixture cooling chamber 20 having a small height is defined above an upper surface of the partition plate 41. An arcuate notch $41_1$ is formed at an end of the partition plate 41 farthest from the spark plug 17 to permit the communication between the combustion chamber 12 and the air-fuel mixture cooling chamber 20 (see FIG. 14). The partition plate 41 is supported movably in upward and downward direction in the cylinder head 3 through a guide rod 43 and biased upwards by a return spring 44.

A cam shaft 45 is mounted above the partition plate 41 and connected to the crankshaft through a transmitting mechanism (not shown), so that it is rotated at a number of rotations which is one half of a number of rotations of the crankshaft. A cam 46 fixed to the cam shaft 45 abuts against a cam follower 47 fixed to an upper end of the guide rod 43. While the crankshaft performs two rotations, the volume of the air-fuel mixture cooling chamber 20 is increased and decreased one time, as shown in the graph in FIG. 6.

According to the third embodiment, the same operation and effect as those in the first embodiment can be provided, but also the structure of the cooling-chamber volume changing means 31 for increasing and decreasing the volume of the air-fuel mixture cooling chamber 20 can be substantially simplified, as compared with the case when the air-fuel mixture cooling chamber 20 is defined above the upper surface of the main piston 4 as in the first embodiment.

Although the embodiments of the present invention have been described in detail, it will be understood that the present invention is not limited to the above-described embodiments, and various modifications in design may be made without departing from the spirit and scope of the invention defined in claims.

For example, the timing of increasing and decreasing the volume of the air-fuel mixture cooling chamber 20 and the amount of volume changed are not limited to those in the embodiments, and can be changed to any extent depending upon the characteristic of the engine.

What is claimed is:

1. A combustion control system for an engine, comprising an air-fuel mixture cooling chamber which communicates with a combustion chamber defined in a cylinder head, so that an air-fuel mixture can flow from the air-fuel mixture cooling chamber into the combustion chamber and vice versa, and a cooling-chamber volume changing means for increasing and decreasing a volume of the air-fuel mixture cooling chamber in operative association with a rotation of a crankshaft, wherein the cooling-chamber volume changing means is operable to decrease the volume of the air-fuel mixture cooling chamber during burning of the air-fuel mixture in the combustion chamber.

2. A combustion control system for an engine according to claim 1, further including a sub-piston supported movably in upward and downward direction on a main piston which is slidably received in a cylinder bore, said air-fuel mixture cooling chamber being defined between an upper surface of said main piston and a lower surface of said sub-piston.

3. A combustion control system for an engine according to claim 2, further including a subsidiary connecting rod relatively movably accommodated in a main connecting rod which connects said main piston and said crankshaft to each other, said subsidiary connecting rod being connected at an upper end thereof to said sub-piston and at a lower end thereof to a cam member which is rotatably supported on said crankshaft.

4. A combustion control system for an engine according to claim 3, wherein said cam member is connected to a casing through a gear train, so that the cam member is rotated in operative association with the rotation of said crankshaft.

5. A combustion control system for an engine according to claim 4, wherein said cam member performs one rotation for every two rotations of the crankshaft, and the volume of the air-fuel mixture cooling chamber is increased and decreased one time for every two rotations of the crankshaft.

6. A combustion control system for an engine according to claim 2, further including a subsidiary connecting rod which is relatively movably accommodated in a main connecting rod connecting the main piston and the crankshaft to each other and which is connected at an upper end thereof to the sub-piston, and a swingable member which is swingable in operative association with the rotation of the crankshaft and which is pivotally supported near a lower end of the main connecting rod, said subsidiary connecting rod being connected at a lower end thereof to the swingable member.

7. A combustion control system for an engine according to claim 6, wherein said swingable member is in cam engagement with said crankshaft for swinging movement.

8. A combustion control system for an engine according to claim 7, wherein said swingable member is swung one time for every one rotation of said crankshaft, and the volume of said air-fuel mixture cooling chamber is increased and decreased one time for every one rotation of said crankshaft.

9. A combustion control system for an engine according to claim 1, further including a spark plug which is disposed at a substantially central portion of the combustion chamber, said combustion chamber communicating at a peripheral edge thereof with said air-fuel mixture cooling chamber.

10. A combustion control system for an engine according to claim 9, wherein said air-fuel mixture cooling chamber is defined at a substantially constant gap between an upper surface of the main piston and a lower surface of a sub-piston.

11. A combustion control system for an engine according to claim 1, further including a partition plate which is supported movably in upward and downward direction in the cylinder head to face an upper surface of a piston, said combustion chamber being defined between the upper surface of the piston and a lower surface of said partition plate, said air-fuel mixture cooling chamber being defined above an upper surface of said partition plate.

12. A combustion control system for an engine according to claim 11, further including a spark plug which is disposed at one of diametrically opposite ends of the combustion chamber, said combustion chamber communicating at the other of the diametrically opposite ends with said air-fuel mixture cooling chamber.

13. A combustion control system for an internal combustion engine having a combustion chamber defined in a cylinder of the engine between a main piston and a cylinder head, comprising means for forming an air-fuel mixture cooling chamber between the main piston and the cylinder head separate from a main portion of the combustion chamber, and means for increasing and decreasing a volume of the air-fuel mixture cooling chamber in operative association with movement of the piston for decreasing the volume of the air-fuel mixture cooling chamber during burning of the air-fuel mixture in the combustion chamber.

14. A combustion control system for an engine according to claim 13, wherein said means for forming an air-fuel mixture cooling chamber includes a sub-piston supported on a top of the main piston for movement toward and away from the main piston, said air-fuel mixture cooling chamber being defined between an upper surface of the main piston and a lower surface of said sub-piston.

15. A combustion control system for an engine according to claim 14, further including a subsidiary connecting rod movable relative to the main piston, said subsidiary connecting rod being connected at an upper end thereof to said sub-piston and at a lower end thereof to a crankshaft through means for causing said relative movement.

16. A combustion control system for an engine according to claim 14, wherein said sub-piston is of a smaller diameter than the main piston for forming a circumferential inlet and outlet a wall of the cylinder for the air-fuel mixture cooling chamber.

17. A combustion control system for an engine according to claim 13, further including a spark plug which is disposed at a substantially central portion of the combustion chamber, said combustion chamber communicating at a peripheral edge thereof with said air-fuel mixture cooling chamber.

18. A combustion control system for an engine according to claim 17, wherein said air-fuel mixture cooling chamber is defined at a substantially constant gap between an upper surface of the main piston and a lower surface of a sub-piston.

19. A combustion control system for an engine according to claim 13, further including a partition plate which is supported movably in an upward and downward direction in the cylinder head to face an upper surface of the main piston, said combustion chamber being defined between the upper surface of the piston and a lower surface of said partition plate, said air-fuel mixture cooling chamber being defined above an upper surface of said partition plate.

20. A combustion control system for an engine according to claim 19, further including a spark plug which is disposed at one of diametrically opposite sides of the combustion chamber, said combustion chamber communicating at the other of the diametrically opposite sides with said air-fuel mixture cooling chamber.

\* \* \* \* \*